United States Patent
Okuyama et al.

(10) Patent No.: US 6,637,892 B1
(45) Date of Patent: Oct. 28, 2003

(54) PROJECTION APPARATUS

(75) Inventors: Atsushi Okuyama, Tokorozawa (JP); Hiroyuki Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/696,857

(22) Filed: Oct. 26, 2000

(30) Foreign Application Priority Data

Oct. 27, 1999 (JP) .............................................. 11-305618

(51) Int. Cl.[7] ......................... G03B 21/14; G03B 21/20; G02F 1/1335
(52) U.S. Cl. .............................. 353/38; 353/102; 349/7; 349/8; 349/57; 349/62; 349/95
(58) Field of Search ....................... 353/38, 102; 349/7, 349/8, 57, 62, 95, 5

(56) References Cited

U.S. PATENT DOCUMENTS 5,418,583 A * 5/1995 Masumoto ................... 353/38
6,273,569 B1 * 8/2001 Iechika et al. ................. 353/38

FOREIGN PATENT DOCUMENTS

| JP | 9-54279 | 2/1997 |
| JP | 9-159968 | 6/1997 |
| JP | 9-222581 | 8/1997 |

* cited by examiner

*Primary Examiner*—Russell Adams
*Assistant Examiner*—Magda Cruz
(74) *Attorney, Agent, or Firm*—Morgan & Finnegan, L.L.P.

(57) ABSTRACT

In a projection apparatus, an optical integrator is illuminated with light from a light source, one or more image display elements is irradiated with a plurality of beams from the integrator, and image light from the image display element or elements is projected by a projection optical system. The illuminating range of some of the plurality of beams is made smaller than the illuminating range of the other beams.

20 Claims, 10 Drawing Sheets

PROJECTION APPARATUS

BACKGROUND OF THE INVENTION

1. Field of the Invention

This invention relates to a projection apparatus for enlarging and projecting images on a personal computer and images on TV, movies or the like onto a screen or the like, and particularly to a projection apparatus adapted to enable a central portion of a projected image to become brighter to emphasize information of characters, images or the like displayed on the central portion of the screen.

2. Related Background Art

Referring to FIG. 12 of the accompanying drawings which shows the optical system of an image projection apparatus according to the prior art, the reference numeral 1 designates a light source such as a discharge lamp, and the reference numeral 2 denotes a parabolic mirror. The reference numeral 3 designates an optical integrator comprising lens arrays 31 and 32. Also, the reference numeral 4 denotes a polarization converting element array for converting non-polarized light into polarized light having a particular polarization direction, and multiple elements each comprising a polarization separating surface 41, a reflecting surface 42 and a half wavelength plate 43 are arranged.

The reference numeral 5 designates a condensing lens, the reference characters 6R, 6G and 6B denote image display elements for displaying images of respective colors R (red), G (green) and B (blue), and the reference numerals 7 and 8 designate dichroic mirrors constituting a color separating system.

The reference numeral 9 denotes a relay system for directing the illuminating light of B to the image display element, and the relay system 9 comprises relay lenses 91 and 92 and mirrors 93 and 94.

The reference numerals 10 and 11 designate mirrors, the reference characters 12R, 12G and 12B denote condenser lenses for guiding illuminating light to a projection lens, the reference numeral 13 designates a color combining prism for combining R, G and B lights into one, and the reference numeral 14 denotes a projection lens.

The integrator 3 is used to uniformly illuminate the image display elements 6R, 6G and 6B. The action of the integrator 3 will now be described with reference to FIG. 13 of the accompanying drawings. In FIG. 13, the polarization converting element array 4 and the dichroic mirrors 7, 8 are omitted to describe the action of the lens arrays 31 and 32 of the integrator 3.

An illuminating beam Q from the parabolic mirror 2 is divided into a plurality of beams qi by the lens array 31 and the beams qi are condensed near the lens array 32. When at that time, the shape of the aperture of each lens constituting the lens array 31 is made into a rectangle similar to the shape of the image display element 12, each beam is condensed (diverges) as a beam of a rectangular cross-sectional shape. These beams have their direction changed into a predetermined direction by the condensing lens 5, and are gathered so as to overlap one another on the image display element 12. The unevenness of the intensity of the beam Q on the lens array 31 becomes small by the beam Q being divided into a plurality of beams and the plurality of beams being added up, and the uniformization of illumination has been realized.

As described above, the uniformization of the intensity distribution on the image display element 12 becomes possible by the integrator 3, but on the other hand, when data prepared by a personal computer is to be displayed by the use of the image projection apparatus, characters or an image is displayed on a central portion of the screen. Therefore, to emphasize information, it is desired that the central portion on which the information is present be set more brightly. So, methods of making the central portion of the screen brighter than the peripheral portion thereof are disclosed in Japanese Patent Application Laid-Open No. 9-54279 and Japanese Patent Application Laid-Open No. 9-159968. The method disclosed in the above-mentioned Japanese Patent Application Laid-Open No. 9-54279 is designed to shift an illuminated area by each lens toward periphery and illuminate it by the use of a lens array set so as to illuminate a portion narrower than an effective area to thereby change the intensity of the central portion and the peripheral portion. Such a construction, however, suffers from the problem that much of the illuminating light illuminating the peripheral portion illuminates the outside of the effective range of the image display element and this is a great loss of the quantity of illuminating light.

Also, the method disclosed in the above-mentioned Japanese Patent Application Laid-Open No. 9-159968 is to make the central lens of a fly-eye lens larger than the other lenses thereof, and set the size of the large central lens so that the peripheral illuminance of a projected display image may be about 50% of the central illuminance thereof. In this construction, the effective area of the image display element is illuminated with a uniform size by individual lenses constituting a lens array, and the central portion is made brighter than the peripheral portion by the unevenness of intensity created in the lens of the central portion of which the size is set large. Such a method, however, suffers from the problem that a dark portion by a hole in a reflecting mirror created in the central portion of a beam emitted from the reflecting mirror is created at the center of the screen and therefore the image becomes an unnatural and very unsightly image.

SUMMARY OF THE INVENTION

The present invention has as its object to provide a projection apparatus which can solve or mitigate the above-noted problems peculiar to the prior art. Here is disclosed a projection apparatus which can make the central portion of a projected image brighter without the loss of the quantity of light to naturally emphasize information such as characters or an image displayed on the central portion of a screen or the like.

The projection apparatus of the present invention is a projection apparatus in which an optical integrator is illuminated with light from a light source, one or more image display elements is irradiated with a plurality of beams from the optical integrator, and image light from the image display element or elements is projected by a projection optical system, wherein the illuminating range of some of the plurality of beams is made smaller than the illuminating range of the other beams.

Also, the projection apparatus of the present invention is a projection apparatus in which an optical integrator provided with a lens array is illuminated with light from a light source, one or more image display elements is irradiated with a plurality of beams from the integrator, and image light from the image display element or elements is projected by a projection optical system, wherein the optical integrator is designed such that some of the plurality of beams illuminate substantially only the central portion of the image display element or elements and the other beams illuminate the central portion and the peripheral portion of the image display element or elements.

In the above-described projection apparatus, the optical integrator is provided with at least two lens arrays, and when the size of the individual lenses of the lens array on the light source side is defined as p and the focal length of the individual lenses of the lens array on the image display element side is defined as ff2 and K defined by $$K=p/ff2$$

is K value, the integrator is comprised of a combination of lenses differing in K value from each other.

In the above-described projection apparatus, in the K value, the ratio between the maximum value Kmax and the minimum value Kmin of the K value satisfies $$1.2<Kmax/Kmin<2.$$

In the above-described projection apparatus, the lenses differing in the K value are comprised of a combination of lenses differing at multiple stages in the K value.

In the above-described projection apparatus, a polarization converting element array is provided on the light emergence side of the optical integrator, and the polarization converting element array is comprised of a combination of elements differing in the pitch of polarization separating surfaces and reflecting surfaces from one another.

In the above-described projection apparatus, the optical integrator is provided with at least two lens arrays, the focal lengths of a certain lens and other lenses of the lens array on the image display element side differ from each other, and the lens array on the light source side is disposed separately by a distance conforming to the different focal lengths.

In the above-described projection apparatus, the lens array on the light source side is disposed separately at multiple stages in conformity with the focal lengths of the lenses of the lens array on the image display element side.

In the above-described projection apparatus, the optical integrator is provided with at least three lens arrays, the combination of the individual lenses of these lens arrays is changed by at least two lens arrays on the image display element side, and the combined focal lengths by the respective corresponding lenses of the lens arrays differ from each other.

In the above-described projection apparatus, the optical integrator is comprised of a combination of the lens arrays described in the thirdly described projection apparatus and the lens arrays described in the seventhly or eighthly described projection apparatus.

DESCRIPTION OF THE PREFERRED EMBODIMENTS

According to the above-described configuration, of a plurality of beams divided by the lens array of an optical integrator, the illuminating beam by at least one corresponding lens of this lens array is set so as to illuminate a range narrower than the effective area of an image display element, whereby there can be realized a state in which the central portion of a projected image is bright and preferable to display information.

Figure 11:
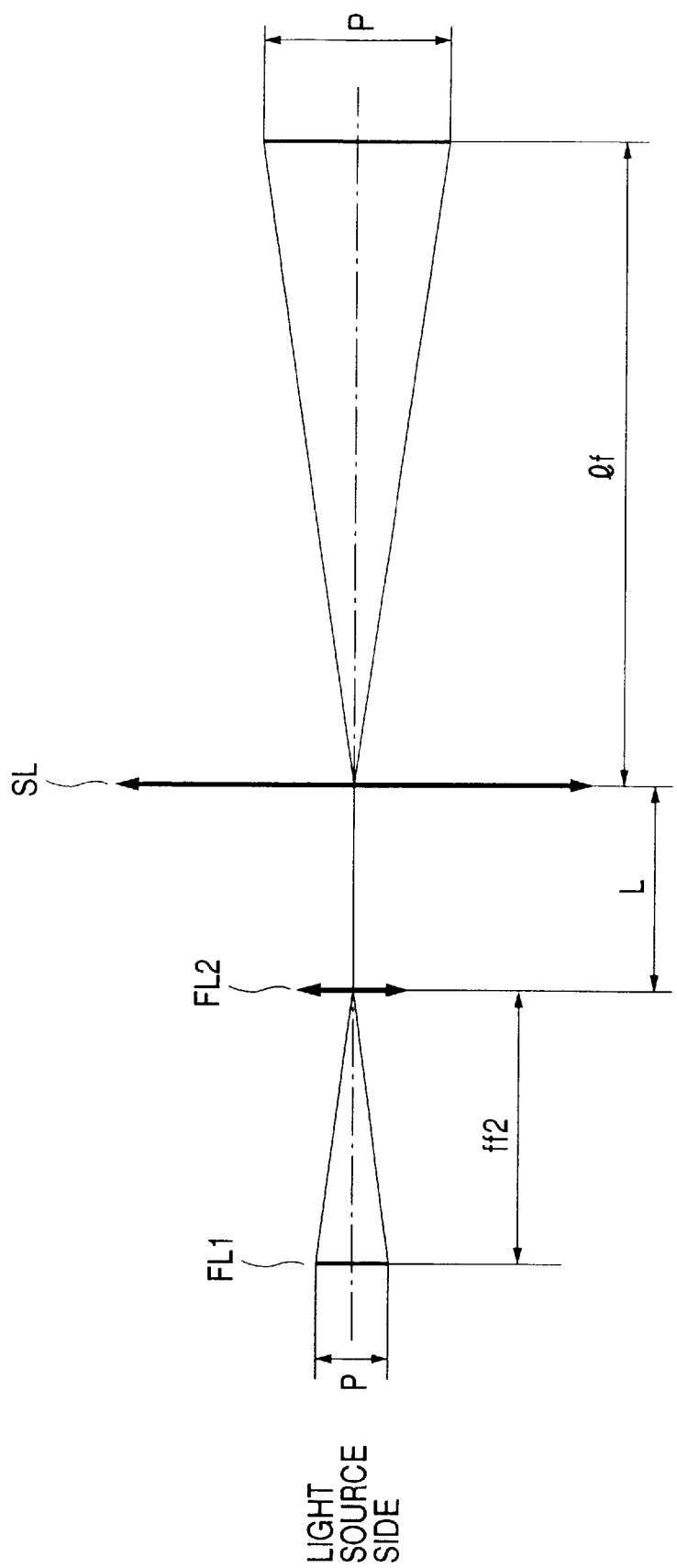
FIG. 11 illustrates the relational expression of an illuminating system by an optical integrator.
Figure 12:
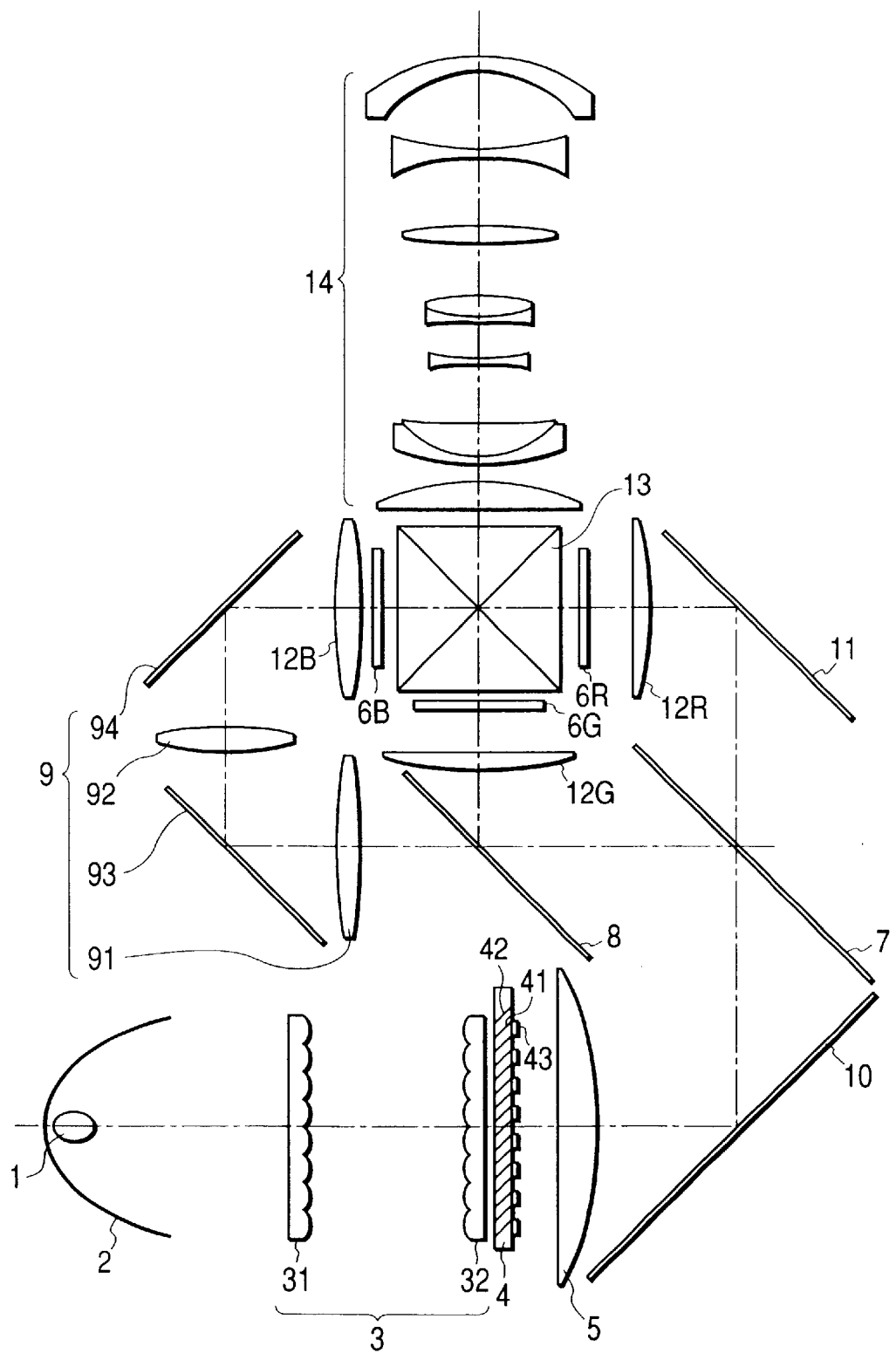
FIG. 12 shows the construction of a projection apparatus according to the prior art.
Figure 13:
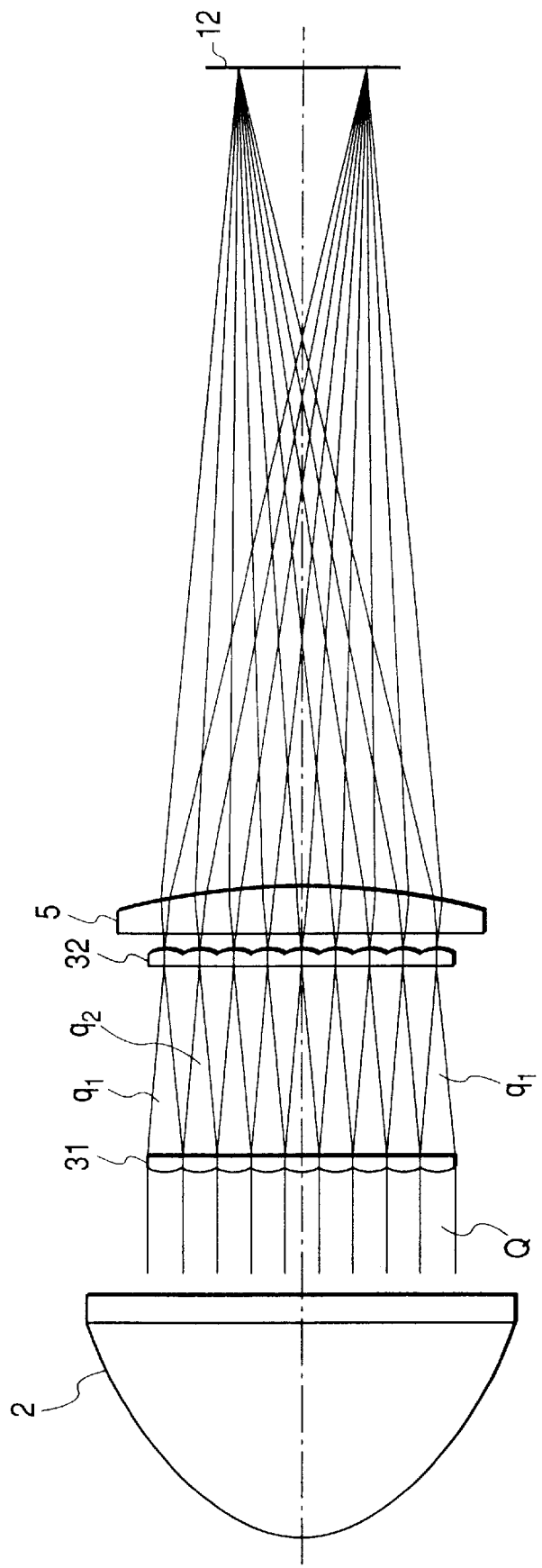
FIG. 13 illustrates the state of illumination by the optical integrator of FIG. 12.

Specifically describing this point, the size P of the illuminating area by this integrator, as shown in FIG. 11, is determined by $$P=p/ff2\times 1f, \qquad (1)$$

where p is the size of the individual lenses of the lens array FL1 on the light source side, ff2 is the focal length of the individual lenses of the lens array FL2 on the image display element side, and 1f is the focal length of the condensing lens SL. At this time, $$p/ff2=P/1f=K, \qquad (2)$$

and when this K is called K value, the time when all K values are equal in an illuminating optical system comprising respective lenses for dividing the beam represents the state of uniform illumination.

So, in the respective lenses of the lens array constituting illuminating systems, design is made such that the K value (=K') in at least one illuminating system has a value differing from the K value (=K) of the other illuminating systems and $$K'<K,$$

whereby K'=P'/1f, K=P/1f and therefore $$P'<P,$$

and at least one illuminating beam by the illuminating optical system can be set so as to illuminate a range narrower than the effective area of the image display element, and make the central portion bright.

Embodiments 1 to 3 of the present invention will hereinafter be described.

Embodiment 1

In order that the illuminating area P' of a certain lens system constituting an optical integrator may be smaller than the illuminating area P of the other lens systems, from expression (2), p' and p can be $$p'<p$$

when ff2 is the same.

Figure 1:
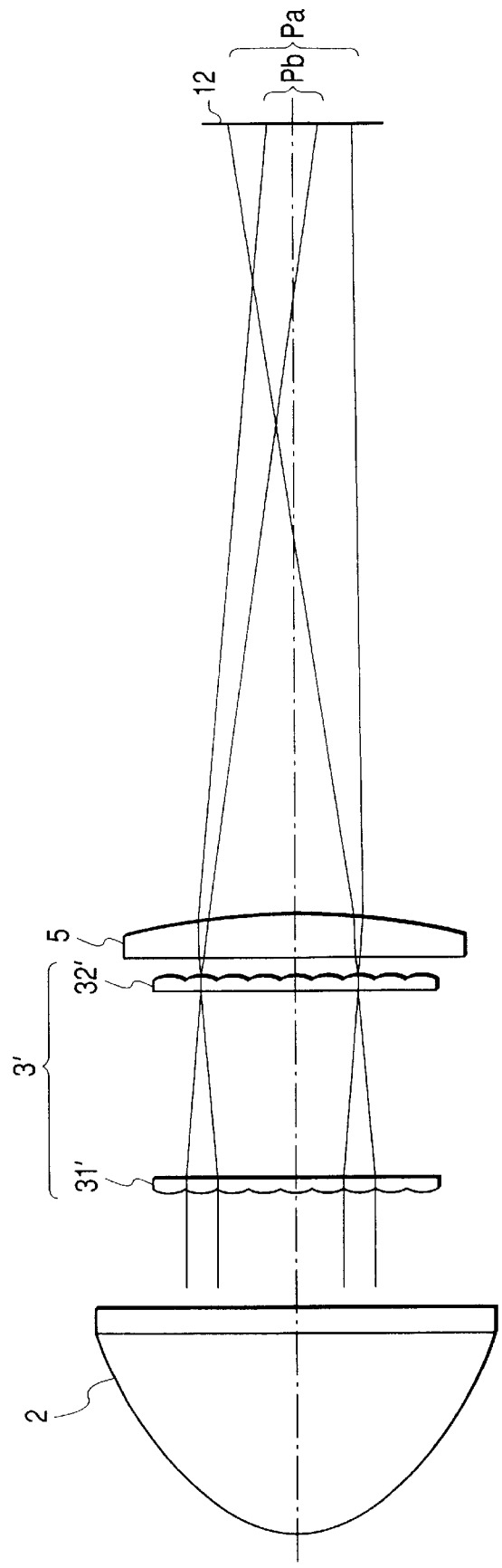
FIG. 1 shows Embodiment 1 of the present invention.

An embodiment satisfying such a condition is shown in FIG. 1. Again in FIG. 1, a polarization converting element array and a dichroic mirror are omitted.

Here, the reference numeral 3' designates an optical integrator according to the present embodiment, and it is comprised of lens arrays 31' and 32'.

Figure 2:
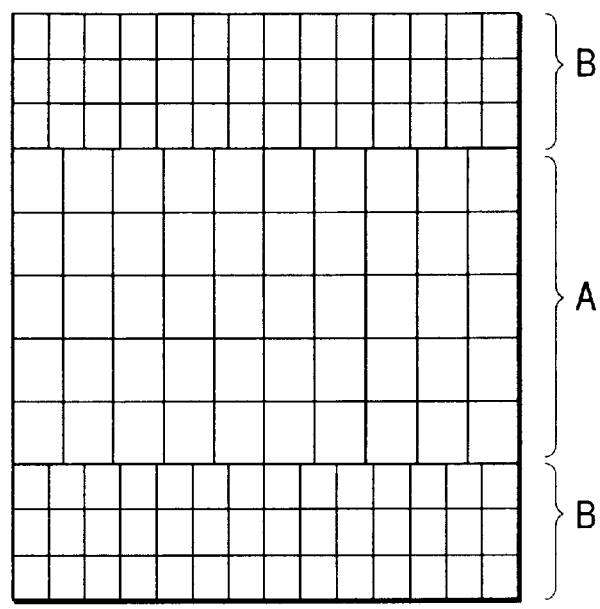
FIG. 2 shows Embodiment 1 of the present invention.

In this construction, the individual lenses of the lens arrays 31' and 32' are of a shape as shown in FIG. 2, and form a lens array in which lenses differing in the size of aperture from one another are combined together.

Here, the illuminating area by the lens arrays in an area A in which the size of the apertures in the lenses is large is Pa on an image display element 12, and the illuminating area by the lens arrays in an area B in which the size of the apertures in the lenses is small is Pb on the image display element 12.

Figure 3:
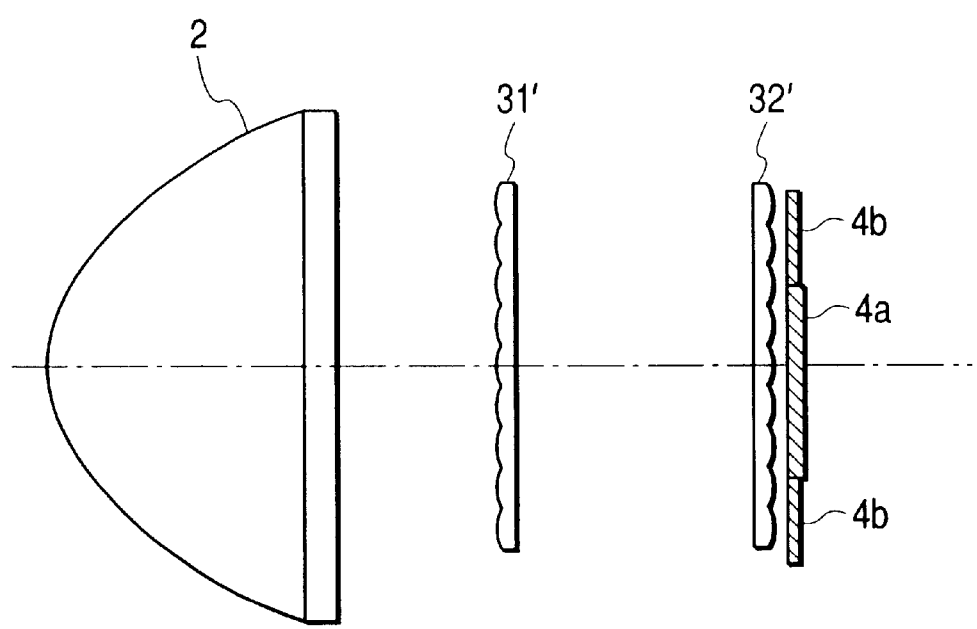
FIG. 3 shows the construction of a polarization converting element in Embodiment 1.

Thereby the central portion of the image display element 12 can be illuminated more brightly than the peripheral portion thereof. A construction in which in FIG. 1, polarization converting element array, not shown, are combined together is such as shown in FIG. 3, and the polarization converting element array is constructed by combining polarization converting elements 4a and 4b differing in the pitch of polarization splitting surfaces and reflecting surfaces from each other. The polarization converting element array can realize converting a non-polarized illuminating beam from the integrator 3' into a polarized light polarized in a particular polarization direction.

Embodiment 2

Embodiment 2 of the present invention will now be described.

Figure 4:
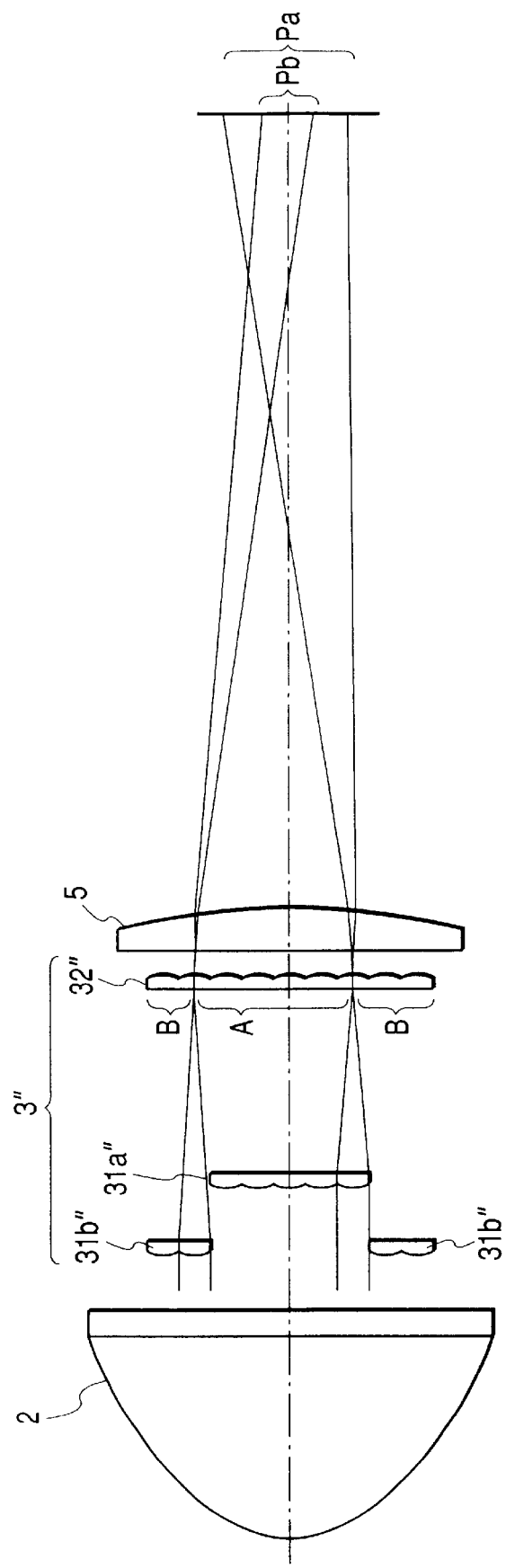
FIG. 4 shows the construction of Embodiment 2 of the present invention.

Another condition under which the illuminating area P' of a certain lens system constituting the optical integrator becomes smaller than the illuminating area P of the other lens system can be ff2"<ff2 when p is the same. FIG. 4 shows the construction of Embodiment 2 for satisfying such a condition. Here, the reference numeral 3" denotes an optical integrator according to the present embodiment, and it is comprised of lens arrays 31a"31b" and 32". In the lens array 32", lenses are formed so that the focal length of the lens array in an area A and the focal length of the lens array in an area B may differ from each other.

The sizes of the individual apertures in the lens arrays 31a" and 31b" are all equal, but these lens arrays 31a" and 31b" are disposed separately at different positions in conformity with the focal length of each lens array of the lens array 32".

Here, the illuminating area by the lens arrays of a short focal length in the area A is Pa on the image display element, and the illuminating area by the lens arrays of a long focal length in the area B is Pb on the image display element 12.

Figure 5:
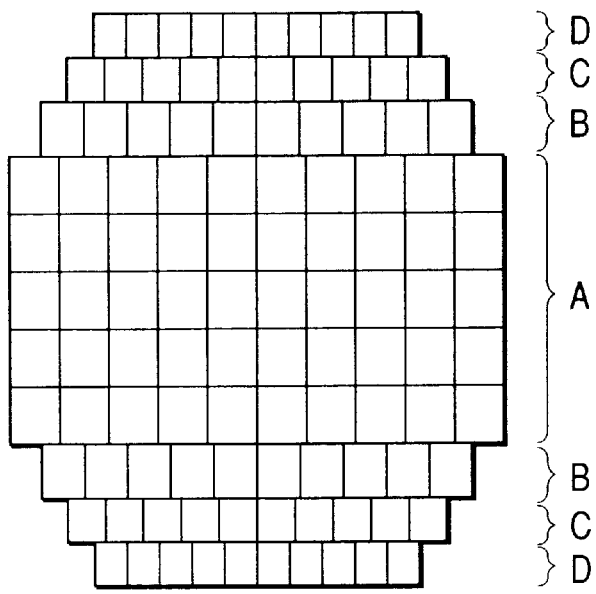
FIG. 5 shows a modification of Embodiment 2 of the present invention.
Figure 6:
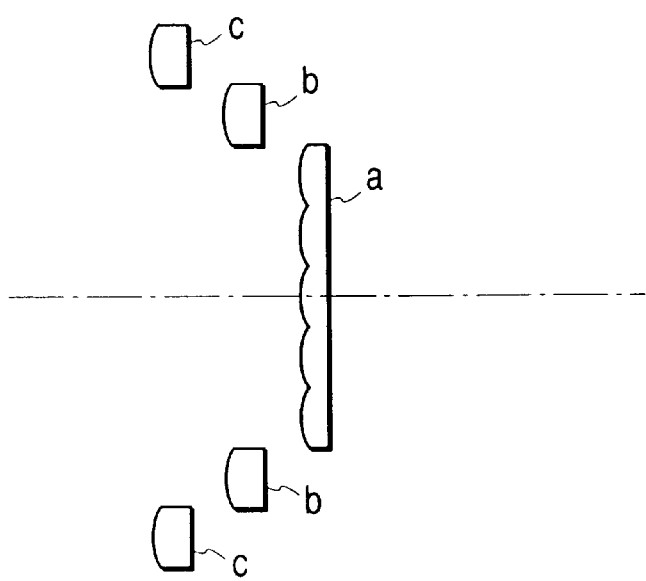
FIG. 6 shows a modification of Embodiment 2 of the present invention.

By this construction, the central portion of the image display element can be illuminated more brightly than the peripheral portion thereof. The polarization converting element array, not shown in FIG. 4, may be of a construction similar to the construction of the prior art. While in Embodiments 1 and 2, the embodiments have been described with one of p and ff2 which are the parameters of the optical integrator being assumed to be constant, both of p and ff2 may be changed and the configuration of Embodiment 1 and the configuration of Embodiment 2 may be combined together. Also, while in this Embodiment 2, there are two kinds of illuminating areas which overlap each other but differ in size from each other, there may be provided a construction by lens arrays in which as shown in FIG. 5, the sizes of apertures in a plurality of sub-lens arrays differ from one another at multiple stages so that more kinds of illuminating areas (illuminating beams) may be produced, or a construction by lens arrays in which as shown in FIG. 6, the focal lengths of a plurality of sub-lens arrays differ from one another at multiple stages.

Embodiment 3

Embodiment 3 of the present invention will now be described.

Figure 7:
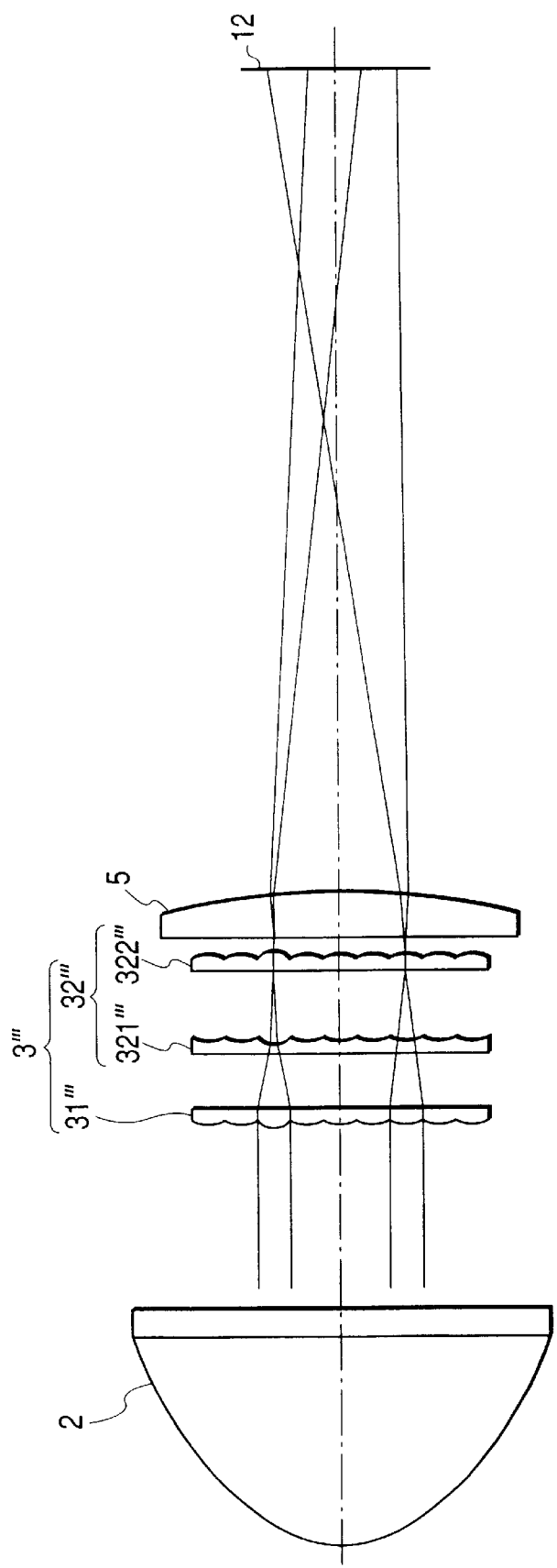
FIG. 7 shows the construction of Embodiment 3 of the present invention.

This embodiment, like Embodiment 2, uses three lens arrays set so that the focal lengths ff2 of a plurality of lens arrays may differ from one another. This construction is shown in FIG. 7.

The reference numeral 3''' designates an optical integrator according to the present embodiment, and it is comprised of a lens array 31''' and a lens array 32''', and further, the lens array 32''' is comprised of a lens array 321''' comprising lenses having negative refractive power and a lens array 322''' comprising lenses having positive refractive power, and the combined focal length of the lens arrays 322''' and 321''' is positive. Here, in the lens array 32''', in a lens system comprising the corresponding lenses of the lens arrays 321''' and 322''', the combination of the focal lengths of the individual lenses of each lens array is changed so that the combined focal lengths of at least two lens systems may differ from each other.

Figures 8, 9:
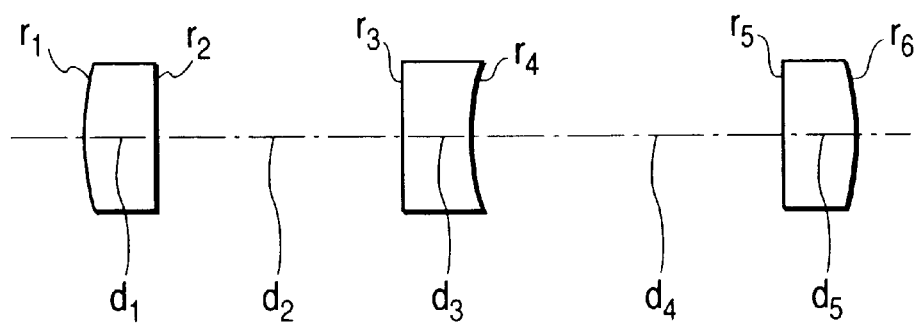
FIG. 8 illustrates the construction of Embodiment 3 of the present invention.
FIG. 9 illustrates a numerical value embodiment of Embodiment 3 of the present invention.

FIG. 8 shows an example of the disposition of a plurality of lenses having different focal lengths.

Each cell represents a lens array, and when the focal length of the lens array 32''' by the lenses of unmarked cells (the combined focal length of the lens arrays 321''' and 322''') is defined as ff2 and the focal lengths of the lens arrays 32''' of cells given marks a, b and c are defined as ff2a, ff2b and ff2c, respectively, $$ff2 < ff2a < ff2b < ff2c,$$

and this is the combination of multistage focal lengths.

At this time, it is desirable that the ratio between the longest combined focal length ff2max and the shortest combined focal length ff2min satisfy the condition that 1.2<ff2max/ff2min<2, and if the ratio is smaller than the range of this condition, the illuminating light cannot be efficiently gathered at the central portion, and if the ratio is greater than the range of this condition, the curvature radiuses of the lenses constituting the illuminating system will become too small and the manufacture of the lens array will become difficult.

Tables 1 and 2 below show numerical value embodiments when such a construction is adopted. As shown in FIG. 9, the shapes of the lens arrays 31''', 321''' and 322''' are represented in the order of r1, r2, . . . .

TABLE 1

|   | r | d | n | v |
|---|---|---|---|---|
| 1 | r1 | 2.5 | 1.51633 | 64.1 |
| 2 | plane | 9.0 | | |
| 3 | plane | 2.5 | 1.51633 | 64.1 |
| 4 | r4 | 11.6 | | |
| 5 | plane | 2.5 | 1.51633 | 64.1 |
| 6 | r6 | | | |

TABLE 2

|  | unmarked | A | B | C |
|---|---|---|---|---|
| r1 | +10.52 mm | +10.3 | +9.35 | +8.80 |
| r4 | +7.89 | +6.92 | +4.67 | +3.55 |
| r6 | −10.52 | −10.29 | −9.63 | −9.20 |

The combined focal lengths of r3 to r6 in each area are
unmarked: 37.9 mm
A: 39.5
B: 45.6
C: 52.0
and the ratio between the maximum focal length and the minimum focal length is
52.0/37.9=1.37

Table 3 below is still another numerical value embodiment, and the construction of the lenses of the lens array in this table is the same as that of the example shown in Table 1.

TABLE 3

|    | unmarked   | A     | B      | C     |
|----|------------|-------|--------|-------|
| r1 | +10.52 mm  | +10.3 | +10.15 | +9.56 |
| r4 | +7.89      | +6.92 | +4.93  | +3.71 |
| r6 | −10.52     | −10.3 | −10.15 | −9.56 |

The combined focal lengths of r3 to r6 in each area are
unmarked: 37.9 mm
A: 39.5
B: 58.8
C: 67.6
and the ratio between the maximum focal length and the minimum focal length is
67.6/37.9=1.78.

Figure 10:
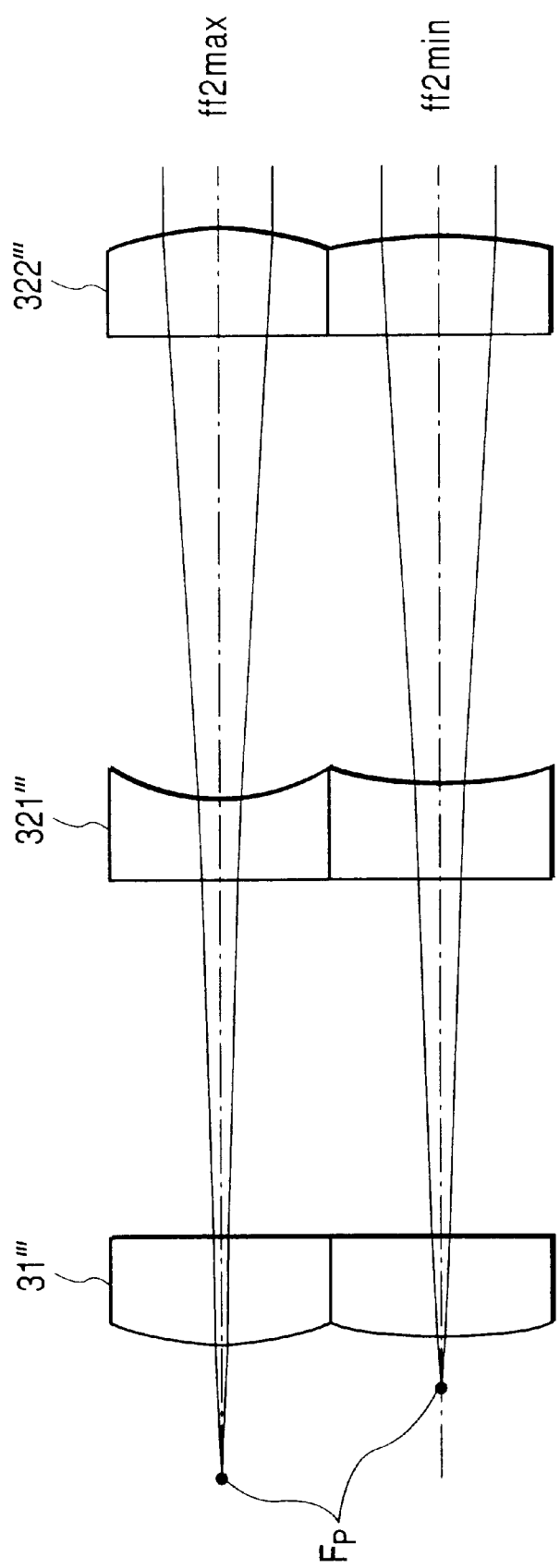
FIG. 10 illustrates a numerical value embodiment of Embodiment 3 of the present invention.

In this numerical value embodiment, the focus position is set so as to become more distant from the lens array 31''' as the combined focal length becomes longer, and design is made such that the shapes of the lens array 31''' and the lens array 322''' become the same. In this embodiment, the relative relation between the combined focus position of the lens array 32''' (the lens array 31''' side) and the position of the lens array 31''' differs in conformity with the focal length as shown in FIG. 10.

What is claimed is:

1. A projecting apparatus comprising:
   an optical integrator including a lens array for receiving light from a light source, for dividing light received by said lens array into a plurality of light beams;
   at least one or more display elements;
   an irradiation optical system for irradiating said at least one or more display elements with said plurality of light beams; and
   a projection optical system for projecting light from said at least one or more display elements onto a projected plane,
   wherein said lens array of said optical integrator includes at least a first group comprising a plurality of lenses and a second group comprising a plurality of lenses, and an area irradiated by a light beam emerged from one of said plurality of lenses comprised in said first group is smaller than that irradiated by a light beam emerged from one of said plurality of lenses comprised in said second group.

2. A projecting apparatus according to claim 1, wherein said light beam emerged from said one of said plurality of lenses comprised by said first group irradiates substantial center portion of said at least one or more display elements, and said light beam emerged from said one of said plurality of lenses comprised by said second group irradiates substantial center portion and periphery of said at least one or more display elements.

3. An apparatus according to claim 1, wherein said integrator has plural lens arrays, each of which includes a plurality of lenses, and
   wherein when a size of a certain lens included in a lens array arranged on light source side among said plural lens arrays is defined as p, a focal length of one or more lenses included in one or more lens arrays other than said lens array arranged on said light source side, corresponding to said certain lens is defined as ff2, and K value defined by equation $K=p/ff2$, said integrator has lens combinations of which K value are different from each other.

4. A projection apparatus according to claim 3, wherein in said K value, the ratio between the maximum value Kmax and the minimum value Kmin of the K value satisfies $1.2<Kmax/Kmin<2$.

5. An apparatus according to claim 3, wherein the combinations of lenses have multiple K values.

6. A projection apparatus according to claim 3, wherein a polarization converting element array is provided on the light emergence side of said integrator, and said polarization converting element array is comprised of a combination of elements differing in the pitch of polarization splitting surfaces and reflecting surfaces from one another.

7. An apparatus according to claim 1, wherein said integrator has at least two lens arrays, a focal length of a certain lens of a lens array on display element side and other focal length of other lens of the lens array are different from each other, and the lens array on light source side is disposed separately by a distance conforming to difference between the focal lengths.

8. A projection apparatus according to claim 7, wherein the lens array on said light source side is disposed separately at multiple stages in conformity with said focal lengths of the lenses of the lens array on said display element side.

9. A projection apparatus according to claim 1, wherein said integrator is provided with at least three lens arrays, the combination of the individual lenses of these lens arrays is changed by at least two lens arrays on said display element side, and the combined focal lengths by the respective corresponding lenses of said lens arrays differ from each other.

10. The projecting apparatus of claim 1 wherein said integrator is provided with plural lens arrays, each of said arrays including a plurality of lenses;
    wherein a variable p is defined to be the aperture size of a lens included in a lens array, of said plural lens arrays, that is arranged on light source side among said plural lens arrays, wherein a variable ff2 is defined to be the focal length of a lens included in a lens array, of said plural lens arrays, that is not arranged on said light source side, and wherein a variable K is defined by an equation $K=p/ff2$, said integrator having lens combinations that result in values of variable K that differ from each other; and
    wherein a focal length of a first lens of the lens array not arranged on said light source side differs from a focal length of a second lens of the lens array not arranged on said light source side, and the lens array arranged on said light source side is disposed separately by a distance conforming to difference between the focal lengths.

11. The projecting apparatus of claim 10, wherein the lens array on said light source side is disposed separately at multiple stages in conformity with the focal length of said first lens and the focal length of said second lens.

12. An apparatus according to claim 1, wherein said integrator has first and second lens arrays each of which includes a plurality of lenses, and each lens of said first lens array corresponds to each lens of said second lens array respectively, and wherein when a size of a certain lens included in said first lens is defined as p, a focal length of one or more lenses included in said second lens array corresponding to said certain lens is defined as ff2, and K value is defined by equation $$K=p/ff2,$$

said integrator has lens combinations of which K value are different from each other.

13. An apparatus according to claim 12, wherein said first lens array is separately arranged at a plurality of positions shifted from each others in an optical axis direction of said irradiation optical system.

14. An apparatus according to claim 1, wherein said integrator has first, second and third lens arrays each of which includes a plurality of lenses, and each lens of said first lens array corresponds to each lens of said second and third lens arrays respectively, and wherein when a size of a certain lens included in said first lens is defined as p, a combined focal length of a lens included in said second lens array and corresponding to said certain lens and a lens included in said third lens array and corresponding to said certain lens is defined as ff2, and K value defined by equation $$K=p/ff2,$$

said integrator has lens combinations of which K value are different from each other.

15. An apparatus according to claim 14, wherein said first lens array is separately arranged at a plurality of positions shifted from each others in an optical axis direction of said irradiation optical system.

16. An apparatus according to claim 1, wherein said integrator has plural lens arrays and a lens array among said plural lens arrays arranged on light source side is arranged at a plurality of positions shifted from each others in an optical axis direction of said irradiation optical system.

17. An apparatus according to claim 1, wherein said integrator has, in order from light source side, a first, second and third lens arrays, said second lens array includes a lens having negative refractive power, and said third lens array includes a lens having positive refractive power.

18. An apparatus according to claim 17, wherein each of lenses included in said first lens array is separately arranged at a plurality of positions shifted from each others in an optical axis direction of said irradiation optical system, in accordance with a difference between combined focal lengths of lenses in said second and third lens arrays corresponding said each of lenses included in said first lens array.

19. A projection apparatus comprising:

an optical integrator illuminated with light from a light source, for dividing light from said light source into a plurality of light beams;

at least one or more display elements irradiated with said plurality of light beams;

an irradiation optical system for irradiating said at least one or more display elements with said plurality of light beams; and a projection optical system for projecting light from said at least one or more display elements onto a projected plane, wherein said integrator has plural lens arrays and among said plural lens array, a lens array positioned at light source side includes a plurality of lenses of which focal distance are different from each others.

20. An apparatus according to claim 19, wherein said lens array positioned at light source side is separately arranged at a plurality of positions shifted from each others in an optical axis direction of said irradiation optical system.

* * * * *

UNITED STATES PATENT AND TRADEMARK OFFICE
CERTIFICATE OF CORRECTION

PATENT NO. : 6,637,892 B1  Page 1 of 1
DATED : October 28, 2003
INVENTOR(S) : Atsushi Okuyama et al.

It is certified that error appears in the above-identified patent and that said Letters Patent is hereby corrected as shown below:

Column 5,
Line 36, "31a"31b"" should read -- 31a", 31b" --

Signed and Sealed this

Thirteenth Day of April, 2004

JON W. DUDAS
*Acting Director of the United States Patent and Trademark Office*